United States Patent Office 2,906,672
Patented Sept. 29, 1959

2,906,672

METHOD OF CONDUCTING MICROBIAL COUNTS

Robert P. Straka, Berkeley, and Jacob L. Stokes, El Cerrito, Calif., assignors to the United States of America as represented by the Secretary of Agriculture No Drawing. Application January 3, 1957
Serial No. 632,398

6 Claims. (Cl. 195—103.5)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to methods for determining the microbial population of substances, particularly foods, which are contaminated with natural microbial flora. A specific object of the invention is the provision of methods for preserving the viability of the microorganisms during the testing operation, and particularly in the step of the operation wherein the test sample is diluted with a liquid medium suitable for inoculating a nutrient medium, such as an agar plate. Further objects and advantages of the invention will be obvious from the following description.

In making bacterial counts on foods and similar materials the following technique is universally employed. Samples of the material to be tested are intimately mixed with varying volumes of a diluent to prepare a series of suspensions of decreasing concentrations. For example, one suspension may represent a tenth dilution, another a hundredth dilution, another a thousandth dilution, and so on. The resulting suspensions are then applied to agar plates and the inoculated plates are incubated for several days. The number of bacterial colonies on the plates is then determined by count. From the number of bacterial colonies and the degree of dilution employed one can readily calculate the microbial population of the original sample. The step of diluting the sample with a liquid diluent is essential so that one can establish on the agar plates distinct colonies each derived from a single bacterial cell. If the dilution step were not employed, the colonies would overlap one another and the number thereof could not be accurately determined.

One disadvantage of this procedure is that the dilution step reduces the viability of the microorganisms particularly if there is any delay between preparation of the bacterial suspension and application of it to the agar plates. As a result, the bacterial count is not always representative of the true microbial population of the sample under test. Most investigators in this field employ as the diluent distilled water, tap water, physiological saline (0.85% NaCl), or phosphate-buffered distilled water. All of these diluents exert a destructive effect on the bacteria and if the diluted material is allowed to stand for 20 minutes, anywhere from 30 to 50% of the bacterial population will be destroyed. This effect is further illustrated by the following experiments:

Samples of commercial frozen chicken pie were diluted with distilled water and phosphate-buffered water. Microbial counts were made as soon as the suspensions were prepared and at various time intervals while the bacterial suspensions were held at room temperature. The following results were obtained:

| Diluent | Initial number of bacteria per gram | Percent change in number of bacteria after standing for— | | | |
|---|---|---|---|---|---|
| | | 20 min. | 40 min. | 60 min. | 120 min. |
| Distilled water | 5,900,000 | −38 | −88 | −93 | −98 |
| Phosphate-buffered water | 12,100,000 | −34 | −56 | −79 | −96 |

It is evident from the above that if the diluted samples are allowed to stand even for 20 minutes, the bacterial count will be but a fraction of that representative of the true bacterial count.

It has also been reported by Stokes and Osborne (Food Research, vol. 21, pp. 264–269, 1956), that *Pseudomonas fluorescens*, a common inhabitant of foods, rapidly dies in water, saline, and phosphate-buffer solutions.

Winslow and Brooke (Journal of Bacteriology, vol. 13, pp. 235–243, 1927), have investigated the effect of dilution on destruction of certain bacteria, namely, *Bact. coli, Bacillus cereus, B. megatherium*, and *B. prodigiosus*. They reported that solutions of meat extract and peptone may be used to dilute bacterial specimens without causing microbial destruction. They ascribe the beneficial effect of peptone and meat extract to the presence of collodial materials in these preparations, stating that these agents promote the viability of the bacteria by a protective colloidal phenomenon.

We have found that certain agents which have no colloidal properties exhibit a preserving action on bacterial preparations. Thus we have found that aqueous solutions of amino acids are eminently suitable as diluent fluids for conducting bacterial counts. When the sample is blended with the amino acid solution, there is no appreciable destruction nor stimulation of the growth of the bacteria for periods of at least an hour. Because of this preservative action of the amino acid solutions, accurate bacterial counts may be obtained even if it is necessary to allow the suspensions to stand for considerable periods of time, for example, to allow for plating of large numbers of samples. Since the amino acid solutions which we employ are free from coloidal constituents, it could not have been predicted that they would exhibit a preservative action on the viability of the microorganisms.

In obtaining bacterial counts within the scope of this invention, the usual technique is employed with the exception that the amino acid solution is employed as the diluent fluid. Thus a sample of the material to be tested is uniformly blended with the amino acid solution. Depending on the microbial population of the sample, the volume of solution may be anywhere from 1 to 1,000,000 or more times the volume of the sample. The resulting suspension is then applied to the conventional media such as agar plates or the like. The inoculated plates are then incubated in the usual way, for example 2 to 3 days at 30° C. The colonies are then counted in the customary manner.

As noted above, the diluent fluid in accordance with the invention is an aqueous solution of an amino acid. The solution may contain a single amino acid or mixtures of two or more amino acids. In the latter category one may employ the mixtures of amino acids produced by complete hydrolysis of protein materials such as casein, egg albumen, gluten, soybean protein, serum proteins, zein, animal flesh, and the like. In the category of individual amino acids, one may employ any one or mixtures of the following: alanine, arginine, aspartic acid, cystine, gultamic acid, glycine, histidine, hydroxyproline, isoleucine, leucine, lysine, methionine, phenylalanine, proline, serine, threonine, tryptophane, tyrosine, or valine. Generally glycine and glutamic acid are preferred as being effective yet generally lower in price than many of the others. The amino acid content of the solution may vary from 0.01% to 1%, preferably a concentration of 0.1% is used. In order to attain maximum preserving effect, the solution should have a pH of 6 to 7.5, preferably 7.0. For the purpose of adjusting the pH of the solution, one may employ any conventional neutralizing agent such as sulphuric acid, hydrochloric acid, sodium hydroxide, potassium hydroxide, or other inorganic acid or base. It is obvious that the amino acids need not be present as such in the solution but may be in the form of their salts, for example, the ammonium, sodium, potassium, or calcium salts.

The proportion of amino acid solution which is employed in the dilution step will vary depending on the microbial population of the test material. Thus for a material which has a low population one may dilute the sample with only an equal volume whereas in more heavily contaminated samples one may employ much larger proportions of diluent, as much as 1,000,000 or more volumes of solution per volume of sample.

The invention is further demonstrated by the following illustrative example:

Samples of a commercial frozen chicken pie were mixed with several diluent fluids to prepare suspensions containing 1 volume of sample diluted to 10,000 volumes. The diluent fluids used were—

(a) Distilled water
(b) A mixture of amino acids prepared by acid-hydrolysis of casein, concentration 0.1%
(c) Sodium glutamate, concentration 0.1%
(d) Glycine, concentration 0.1%

Bacterial counts were made on the suspensions immediately after preparation and after standing for one hour at room temperature (25° C.). The counts were made by applying the suspensions to tryptone glucose extract agar, and incubating the agar plates at 30° C. for 3 days. In each case triplicate runs were made and the average of these are set forth below—

|  | Diluent | pH | Bacteria per gram ($\times 10^4$), initial | Bacteria per gram ($\times 10^4$), after 1 hr. | Change in bacterial count, percent |
|---|---|---|---|---|---|
| (a) | Distilled water | 6.3 | 114 | 76 | −33 |
| (b) | Solutions of casein amino acids. | 6.6 | 114 | 118 | +3 |
| (c) | Solution of sodium glutamate. | 7.4 | 102 | 114 | +12 |
| (d) | Solution of glycine. | 7.0 | 140 | 140 | 0 |

Having thus described the invention, we claim:

1. In the process of determining the microbial population of a material wherein a sample of the material is diluted with a liquid and the resulting bacteria-containing suspension is applied onto a nutrient medium the nutrient medium being then incubated and the resulting bacterial colonies counted, the improvement which comprises diluting the sample with a liquid being an aqueous solution of at least one amino acid selected from the group consisting of alanine, arginine, aspartic acid, cystine, glutamic acid, glycine, histidine, hydroxyproline, isoleucine, leucine, lysine, methionine, phenylalanine, proline, serine, threonine, tryptophane, tyrosine, and valine, the solution being free from collodial substances, whereby the viability of the bacteria is preserved.

2. The process of claim 1 wherein the aqueous solution contains a mixture of amino acids derived by hydrolysis of a protein.

3. The process of claim 1 whereby the aqueous solution contains glutamic acid.

4. The process of claim 1 wherein the aqueous solution contains glycine.

5. A process for determining the microbial population of a material contaminated with adventitious microbial flora which comprises diluting a sample of the material with an aqueous solution of at least one amino acid selected from the group consisting of alanine, arginine, aspartic acid, cystine, glutamic acid, glycine, histidine, hydroxyproline, isoleucine, leucine, lysine, methionine, phenylalanine, proline, serine, threonine, tryptophane, tyrosine, and valine, the solution being free from colloidal substances, whereby to obtain a bacterial suspension in which the viability of the bacteria is preserved, inoculating a nutrient medium with the suspension, incubating the inoculated medium, and thereafter counting the resulting bacterial colonies in the nutrient medium.

6. A process for determining the microbial population of a material contaminated with adventitious microbial flora which comprises diluting a sample of the material with a solution consisting of water, at least one amino acid in a concentration of 0.01 to 1%, the amino acid being selected from the group consisting of alanine, arginine, aspartic acid, cystine, glutamic acid, glycine, histidine, hydroxyproline, isoleucine, leucine, lysine, methionine, phenylalanine, proline, serine, threonine, tryptophane, tyrosine, and valine, and sufficient neutralizing agent to establish a pH or 6 to 7.5, the solution being free from colloidal substances, whereby to obtain a bacterial suspension in which the viability of the bacteria is preserved, inoculating a nutrient medium with the suspension, incubating the inoculated medium, and counting the resulting bacterial colonies in the nutrient medium.

References Cited in the file of this patent

Journal of Bacteriology, vol. 13, pages 235 to 243 (1927).